US009669574B2

United States Patent
Morales-Alvarez et al.

(10) Patent No.: US 9,669,574 B2
(45) Date of Patent: Jun. 6, 2017

(54) TWIN SCREW ROTARY HEAD EXTRUDER, METHOD OF EXTRUSION AND RANDOM EXTRUDED PRODUCTS

(71) Applicant: Frito-Lay North America, Inc., Plano, TX (US)

(72) Inventors: Jorge C. Morales-Alvarez, Plano, TX (US); V. N. Mohan Rao, Plano, TX (US)

(73) Assignee: Frito-Lay North America, Inc., Plano, TX (US)

(*) Notice: Subject to any disclaimer, the term of this patent is extended or adjusted under 35 U.S.C. 154(b) by 102 days.

(21) Appl. No.: 14/538,532

(22) Filed: Nov. 11, 2014

(65) Prior Publication Data

US 2016/0128362 A1  May 12, 2016

(51) Int. Cl.
*B29C 47/12* (2006.01)
*B29C 47/40* (2006.01)
(Continued)

(52) U.S. Cl.
CPC ............ *B29C 47/122* (2013.01); *A23L 7/117* (2016.08); *A23L 7/17* (2016.08); *A23L 7/198* (2016.08);
(Continued)

(58) Field of Classification Search
CPC .. A23L 7/17; A23P 30/20; A23P 30/34; B29C 47/122; B29C 47/402
See application file for complete search history.

(56) References Cited

U.S. PATENT DOCUMENTS 2,350,643 A * 6/1944 Schwebke ................ A23L 7/17
                                                      99/323.4
2,549,559 A   4/1951 Abraham
(Continued)

FOREIGN PATENT DOCUMENTS

EP        0041641 A2    12/1981

OTHER PUBLICATIONS

PCT International Search Report and Written Opinion for PCT/US2015/055267 mailed Feb. 5, 2016 (12 pages).
(Continued)

*Primary Examiner* — Yogendra Gupta
*Assistant Examiner* — Joseph Leyson
(74) *Attorney, Agent, or Firm* — Colin P. Cahoon; Celina M. Orr; Carstens & Cahoon, LLP

(57) ABSTRACT

An improved rotary head extruder incorporates a twin auger system, in lieu of the typically used single auger, to create random extruded products having a density within the range of about 3.0 to about 6.0 lbs/cu ft. Extrusion using the rotary die system of a rotary head extruder together with the twin auger system allows for a wide variety of fine materials to be successfully introduced into and conveyed within a rotary head extruder to the die assembly, where the materials are cooked to form random extruded products. A transition piece at the downstream end of the augers allows for continuous, uniform flow to the die assembly, where cooking takes place. The random extruded products incorporate formulations with various ingredients aside from the typically used corn meal formulations, having different tastes and nutritional benefits while maintaining the desired bulk density, texture, and crunch of random extruded products.

7 Claims, 9 Drawing Sheets

(51) Int. Cl.
*A23L 7/17* (2016.01)
*A23P 30/34* (2016.01)
*A23P 30/20* (2016.01)
*A23L 7/10* (2016.01)
*A23L 11/00* (2016.01)
*A23L 7/117* (2016.01)
*B29C 47/00* (2006.01)
*B29C 47/92* (2006.01)

(52) U.S. Cl.
CPC .............. *A23L 11/05* (2016.08); *A23P 30/20* (2016.08); *A23P 30/34* (2016.08); *A23V 2002/00* (2013.01); *B29C 47/0004* (2013.01); *B29C 47/402* (2013.01); *B29C 47/92* (2013.01); *B29C 2947/92704* (2013.01)

(56) References Cited

U.S. PATENT DOCUMENTS

| | | | |
|---|---|---|---|
| 3,230,582 A | 1/1966 | Hoffman et al. | |
| 3,246,594 A * | 4/1966 | Fisher | A23L 7/17 100/147 |
| 3,402,682 A | 9/1968 | Peden et al. | |
| 3,541,946 A | 11/1970 | Johnston | |
| 3,561,672 A | 2/1971 | Schlutz et al. | |
| 3,676,029 A | 7/1972 | Hopkin | |
| 3,685,429 A * | 8/1972 | McBride | A23N 12/00 99/329 P |
| 3,808,962 A | 5/1974 | Liepa | |
| 3,861,844 A | 1/1975 | Miller | |
| 4,179,255 A | 12/1979 | Hale | |
| 4,285,651 A | 8/1981 | Fetchu et al. | |
| 4,529,370 A | 7/1985 | Holmes et al. | |
| 4,875,847 A | 10/1989 | Wenger et al. | |
| 5,052,911 A | 10/1991 | Mikeska | |
| 5,071,301 A | 12/1991 | Engelhardt et al. | |
| 5,143,738 A * | 9/1992 | Nordin | H03H 11/48 426/231 |
| 5,338,134 A | 8/1994 | Peng | |
| 5,468,029 A | 11/1995 | Blose et al. | |
| 5,496,137 A | 3/1996 | Ochayon et al. | |
| 5,599,562 A | 2/1997 | Harris et al. | |
| 5,942,170 A | 8/1999 | Peitz | |
| 5,962,036 A | 10/1999 | Hauck | |
| 6,280,672 B2 | 8/2001 | Keehn et al. | |
| 6,482,453 B2 | 11/2002 | Wenger et al. | |
| 6,516,650 B1 | 2/2003 | Watanabe et al. | |
| 6,537,050 B1 | 3/2003 | Kasal et al. | |
| 7,275,926 B2 | 10/2007 | Gomes et al. | |
| 7,524,178 B2 | 4/2009 | Rosse et al. | |
| 7,883,735 B2 | 2/2011 | Willoughby et al. | |
| 8,029,721 B2 | 10/2011 | Waatti | |
| 2003/0056657 A1 * | 3/2003 | Warner | A21C 11/20 99/353 |
| 2004/0057811 A1 | 3/2004 | Kelzer | |
| 2007/0119025 A1 | 5/2007 | Hu | |
| 2007/0136995 A1 | 6/2007 | Hu et al. | |
| 2008/0233224 A1 | 9/2008 | Rosse et al. | |
| 2011/0027403 A1 * | 2/2011 | Carlson | A23P 1/12 425/113 |
| 2011/0081438 A1 | 4/2011 | Hunter | |
| 2011/0280683 A1 | 11/2011 | Galipaud | |
| 2013/0273209 A1 | 10/2013 | Baier et al. | |
| 2013/0273219 A1 | 10/2013 | Baier et al. | |
| 2013/0316037 A1 * | 11/2013 | Williams | A23P 1/12 425/280 |

OTHER PUBLICATIONS

850F Fry Type Extruder, American Extrusion International (www.americanextrusion.com).
Heat and Control KoEx Collet Snack Extruder Model KF-400, www.heatandcontrol.com, 2007, 2 pages.

* cited by examiner

TWIN SCREW ROTARY HEAD EXTRUDER, METHOD OF EXTRUSION AND RANDOM EXTRUDED PRODUCTS

BACKGROUND

1. Technical Field

The present invention generally relates to an improved rotary head extruder for the incorporation of ingredients that are otherwise difficult to include within random extruded collets.

2. Description of Related Art

In the formation of random collet products, inclusion of components other than substantially uniform corn meal (i.e., of similar particle size) or refined meals has proven difficult because of the limitations of the rotary head extruder. FIG. 1 depicts the well-liked variety of corn collets known as random corn collets 2, which are produced by a rotary head extruder. Random corn collets 2 comprise unique, twisted ("random") shapes and protrusions and a highly desirable crunchy texture that can only be produced with a rotary head extruder. It is a generally accepted fact in the industry that these kinds of extruders cannot handle flour-like or non-refined granular materials. As such, extruder formulations for random collets comprise only corn grits or corn meal, and water, to create the collets 2 of FIG. 1. While it may be possible to incorporate some amounts of other ingredients to slightly modify the direct expanded products, to date, these amounts are not large enough to significantly vary the varieties or tastes of random collet products. Moreover, introduction of small granular materials such as flour or powder into a continuous random extrusion line typically causes blockage and halts production. Thus, there is a need for a rotary head extruder capable of handling additional formulations on a continuous basis for mass production. In particular, the introduction of ingredients other than corn into a rotary head extruder while mimicking the appealing characteristics of the random corn collet 2 is highly desirable; namely, taste, appearance, density, and mouthfeel (or texture). Such non-corn random collet products should emulate the organoleptic properties, including taste and texture, of a conventionally produced shelf stable (i.e., corn-based) and ready to eat random collet.

BRIEF DESCRIPTION OF THE DRAWINGS

The novel features believed characteristic of the invention are set forth in the appended claims. The invention itself, however, as well as a mode of use, further objectives and advantages thereof, will be best understood by reference to the following detailed description of illustrative embodiments when read in conjunction with the accompanying drawings, wherein:

SUMMARY

Figure 1:
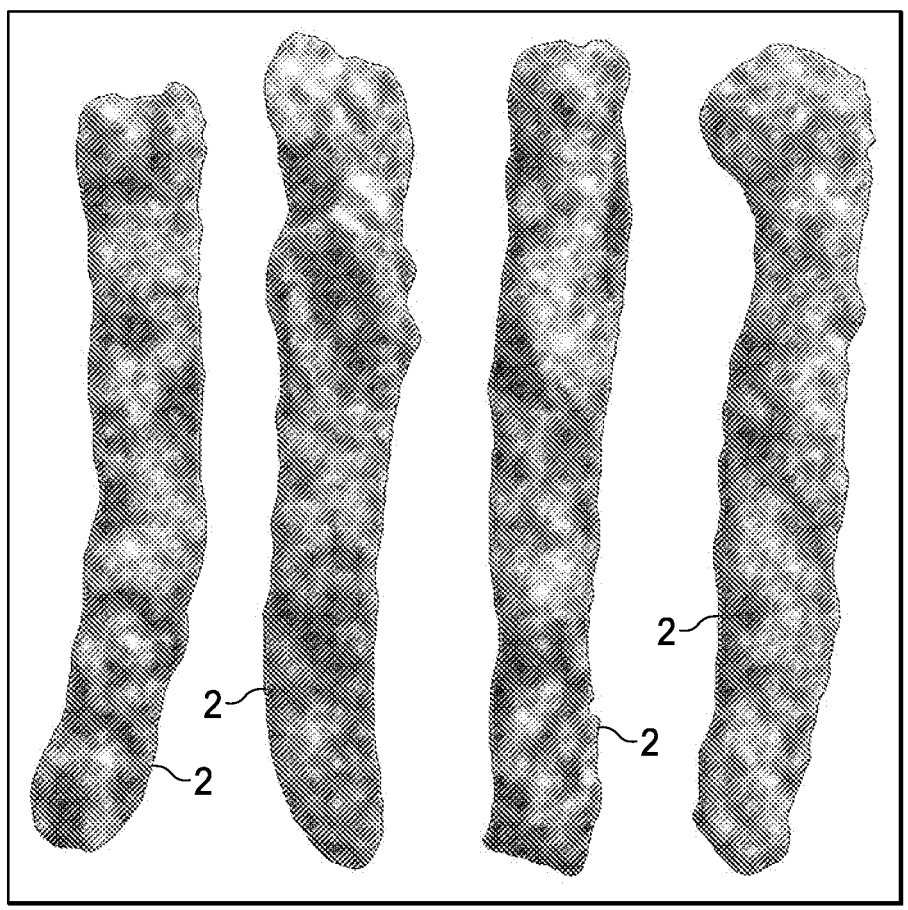
FIG. 1 depicts typical random corn collets as known in the industry.

An improved rotary head extruder successfully replaces the typically used single auger within the extruder with a twin-screw system for continued production and high throughput rates of random extruded products having a density within the range of 3.75-5.5 lbs/cu ft. Two screws (also referred to here as augers) are encased within a single barrel. A transition piece ensures delivery to a stator is continuous and uniform, ensuring proper flow of materials introduced into the barrel of the extruder for extrusion. The stator is a stationary plate surrounding an output end of an interior conical portion downstream from the single barrel. A rotor, or rotatable plate, is downstream from the stator. The rotatable plate comprises a plurality of fingers surrounding a protruding nose cone located within a die gap, which is between the stator and the rotor.

Extrusion using the rotary die system of a rotary head extruder together with the twin auger system described herein allows for a variety of fine particle sizes, a wide particle size distribution, and raw material compositions to be successfully introduced into and conveyed within a rotary head extruder to the die assembly, where the materials are cooked to form a wider array of random extruded products.

The random extruded products incorporate formulations with various ingredients aside from the typically used corn meal formulations, while maintaining the desired bulk density, texture, and crunch of random extruded collet products. Other benefits and advantages of the present invention will become apparent to one skilled in the art.

DETAILED DESCRIPTION

To better understand the limitations of a rotary head extruder in terms of its typically used corn formulations, and the benefits of the improved extruder and method described herein, a discussion of the conventional rotary head extruder is helpful.

Rotary head extruders use two round plates to cook and gelatinize corn meal. One plate is rotating and the other is stationary, producing friction necessary to produce random collets. These extruders are high-shear, high-pressure machines, which generate heat in the form of friction in a relatively short length of time. No barrel heating is applied in rotary head extruders, as the energy used to cook the extrudate is generated from viscous dissipation of mechanical energy. There is no added water, heating element or cooling element used within a rotary head extruder to control temperatures. Instead, rotary head extruders use friction generated within the round plates (and not in the auger or screw zone) to cook the extrudate. There is no mixing and only a very limited compression at the auger of a rotary head extruder; specifically, only enough to convey the material in the gap areas within the barrel. The shear is instead at the fingers 26 (best shown in FIG. 3A), described below. While the auger zone helps transport materials to the die assembly 10, it cannot mix materials and is a poor conveyer of mixed materials and of certain ingredients, including very small ingredients such as powders or flours. Instead, the rotary head extruder is limited to refined cereal meal formulations within a narrow range of particle size. Anything else often results in flow irregularities along the single auger, which turns into blockages in the extruder flow, leading to failure and stoppages of the extruder. In addition, the maximum in-feed throughput capacity is limited to between about 400 to about 450 lb/hr.

Figure 2:
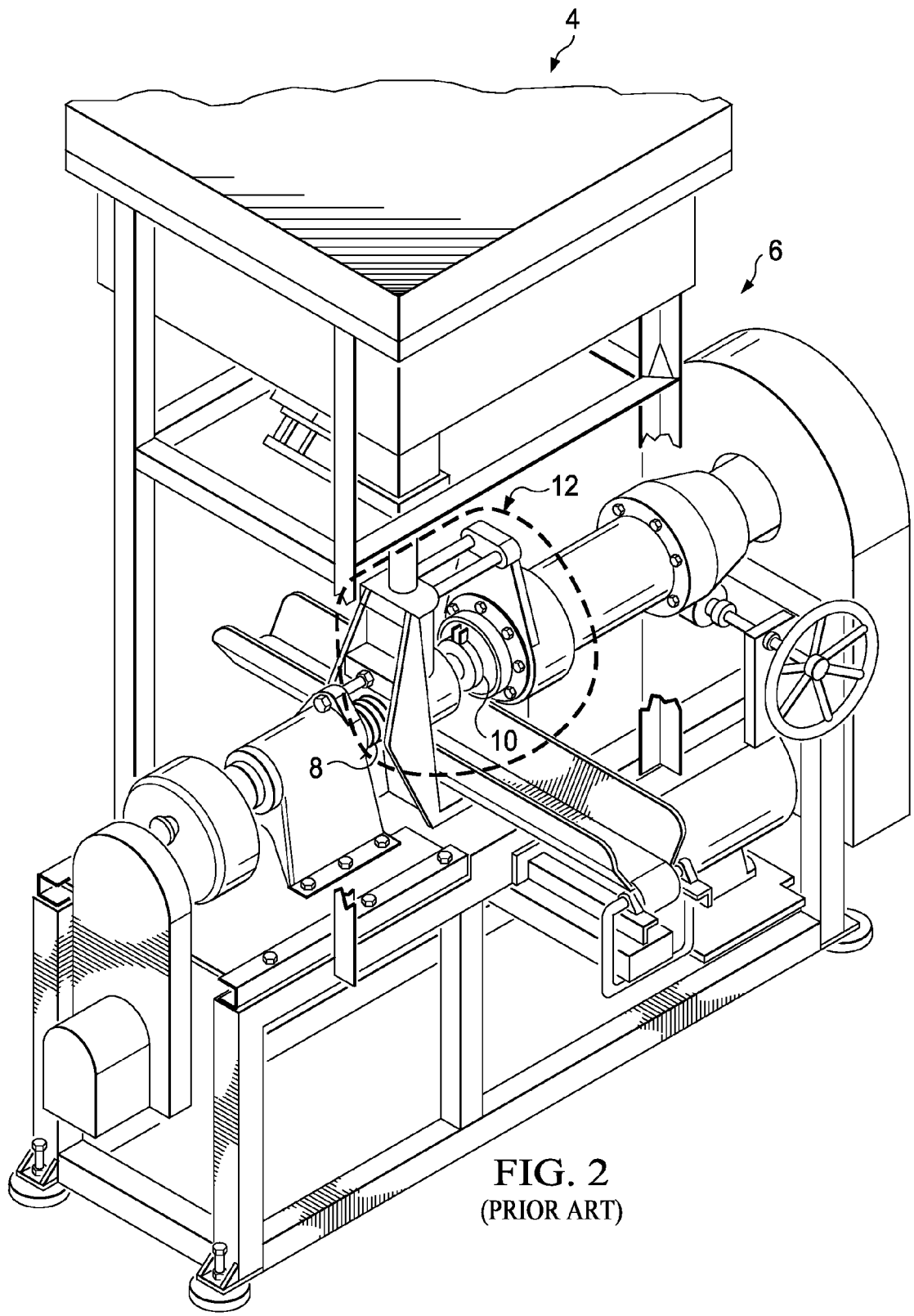
FIG. 2 depicts a perspective view of a prior art rotary head extruder used in manufacturing collets.
Figure 3A:
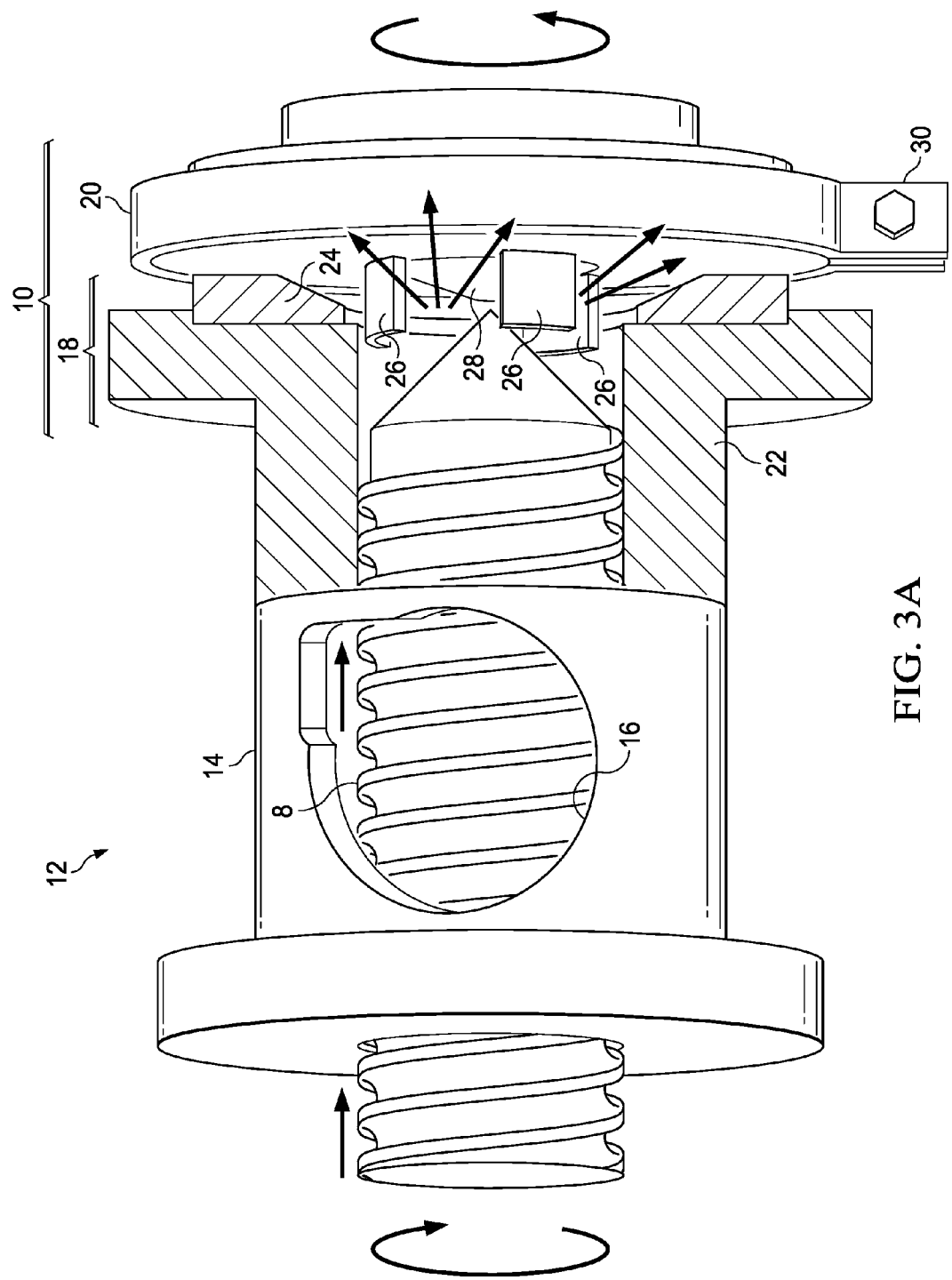
FIG. 3A depicts a close-up view of the main working components of the rotary head extruder depicted in FIG. 2.
Figure 3B:
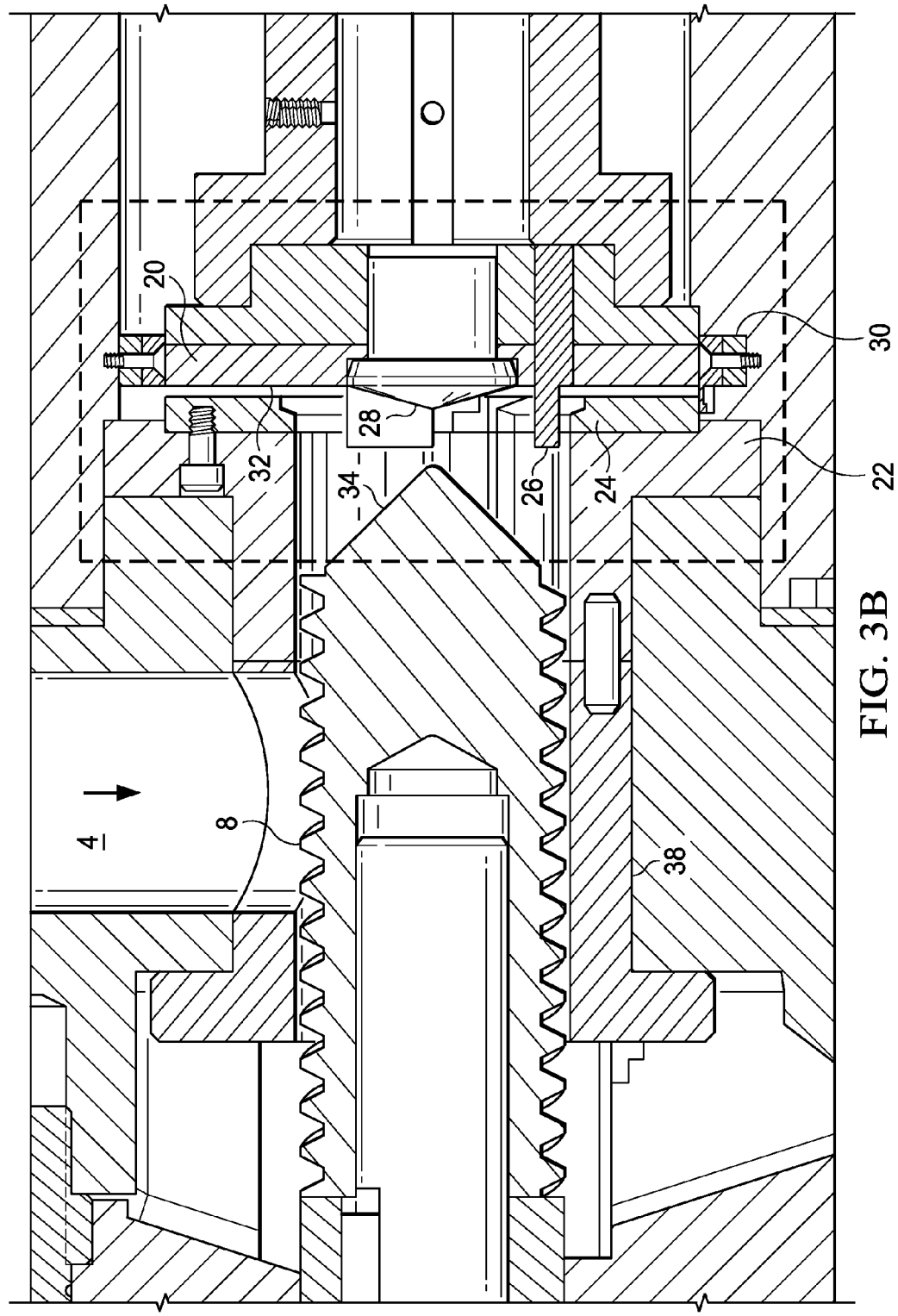
FIG. 3B depicts a detailed cross-sectional view of the main working components of the extruder depicted in FIG. 2.

FIG. 2 illustrates a perspective view of a typical rotary head extruder used for production of the random corn collets 2 depicted in FIG. 1. Pre-moistened cornmeal is gravity-fed through a hopper 4 and into the extruder 6. The rotary head extruder 6 is comprised of two main working components that give the collets their twisted ("random") shapes: a single screw or auger 8 and a rotary die assembly 10. FIGS. 3A and 3B illustrate a close up and detailed side view image of the two main working components 12 of the extruder 6. The auger 8 is housed in a cylindrical casing, or barrel 14, and comprises an open feed section 16 through which the cornmeal passes, shown in FIG. 3. It should be noted that the open feed section 16 is slightly turned in FIG. 3 to better depict the auger 8. In practice, the hopper feeds into the open feed section 16 from above. While the barrel 14 is shown to be quite short in the figures for clarity purposes, it should be noted that its portrayal is merely for purposes of depiction and the barrel length is not drawn to scale. The auger 8 transports and compresses the cornmeal, feeding it to the rotary die assembly 10, where it is plasticized to a fluidized state in a glass transition process further described below.

The die assembly 10 contains two brass alloy round plates: a stator 18 (with the stationary plate) and a rotor 20 (the rotating plate). Gelatinization of moisturized starchy ingredients takes place inside the concentric cavity between these two brass plates 18, 20. The stator 18 is an assembly comprising a stator head section 22 and a round stationary brass plate 24 that acts as a die through which the gelatinized melt flows. The stationary plate 24 has grooves 48 that aid in the compression of cornmeal as the stator 18 works together with the rotor 20. The rotor 20 is a rotating plate comprising fingers 26 and a nose cone 28. The nose cone 28 channels the cornmeal towards the fingers 26 and helps discharge the gelatinized cornmeal through the small gap between the rotor 18 and stator 20. The action of the fingers 26 creates the necessary condition of pressure and heat to achieve plasticization of the raw materials at approximately 260° F. to 320° F. (127° C.-160° C.). Specifically, the fingers 26 force cornmeal back into the grooves of the stator head 24, causing friction and compression of the cornmeal in the gap between the stator 18 and the rotor 20. The brass facing 32 on the rotor 20 also helps to create heat and compression. Random extrusion may thus be characterized by a thermo mechanical transformation of the raw materials brought about by the metal-to-metal interactions of the die assembly 10.

Several things happen within the die assembly 10 during the random extrusion process. First, the corn meal is subjected to high shear rates and pressure that generate most of the heat to cook the corn. Thus, unlike other extruders, most of the cooking takes place in the rotary die assembly 10 of the rotary head extruder. As stated above, there is no added water or external heat used to control the temperatures within this extruder. Second, a rapid pressure loss causes the superheated water in the corn mass to turn to steam, puffing the cooked corn as it exits the die assembly. Third, the flow of corn between one rotating plate 20 and one stationary plate 18 twists the expanding corn leaving it twisted and collapsed in places, resulting in the product characteristic shape shown in FIG. 1. The random collets exit the rotary head extruder circumferentially outward from the gap between the stator and rotor in a radial path from the center of the fingers in the general direction of the straight arrows depicted in FIG. 3A. Cutter blades within a cutter assembly then cut off the collets 2 that result from the expansion process of the stator-rotor interactions. The process is entirely unique, providing unsystematic, irregularly shaped collets and a texture distinct in its crunchiness, giving somewhat of a homemade effect. Typical prior art corn meal specifications for rotary head extruders, for example, include a particle size distribution where no more than 2.5% of the particles can be smaller than 300 microns. The extruder described herein, on the other hand, can successfully process cornmeal with more than about 5%-10% of the particles smaller than 300 microns. While other extruders may provide more flexibility in terms of the components introduced therein, only rotary head extruders can perform random extrusion and create the random collet 2, which upon exit from the extruder, comprises a unique shape and a bulk density ranging from between about 3.0 to about 6.0 lbs/cu ft. or more preferably between about 4.0 to about 5.25 lbs./cu ft.

Figure 4:
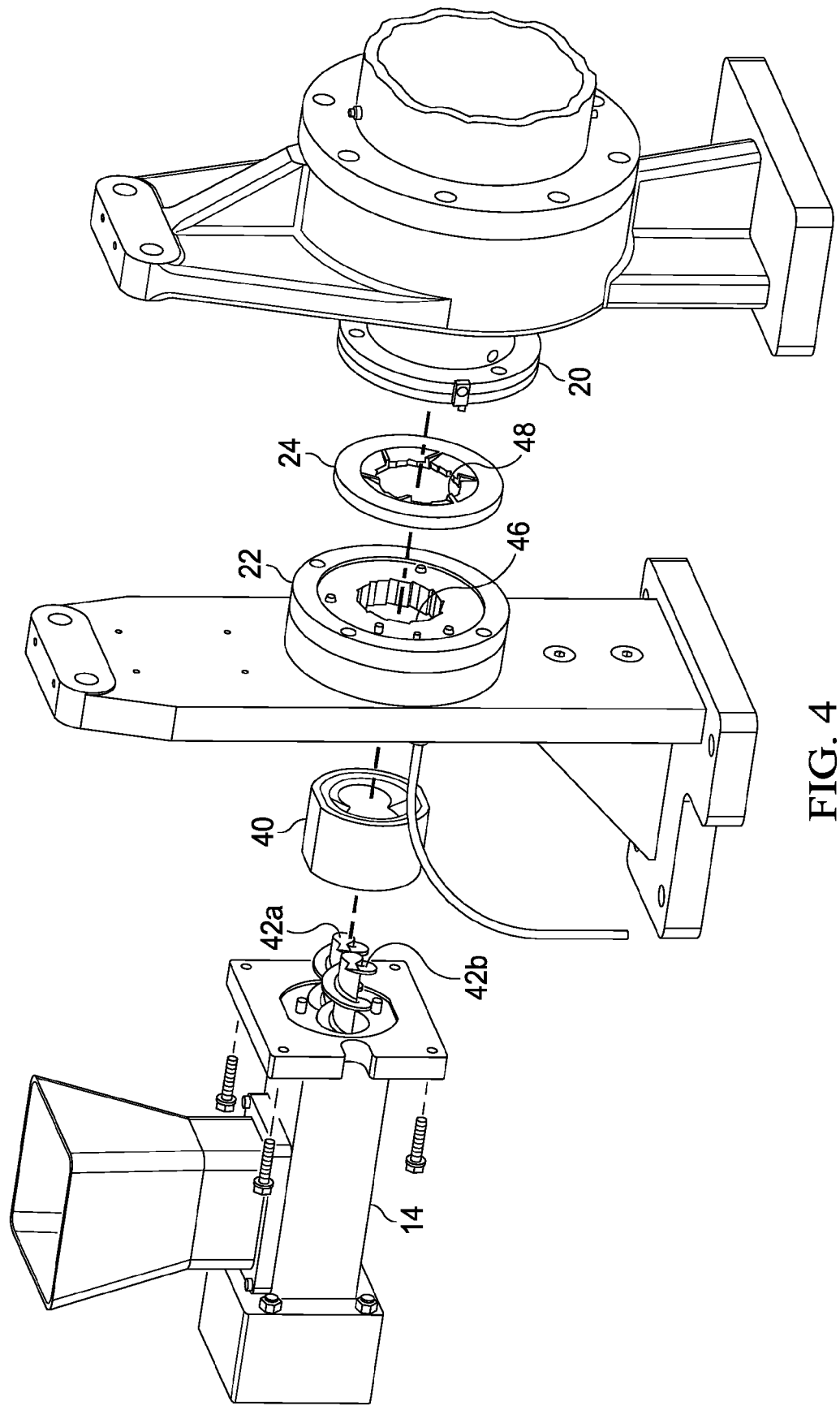
FIG. 4 depicts an exploded view of one embodiment of an improved rotary head extruder.
Figure 5A:
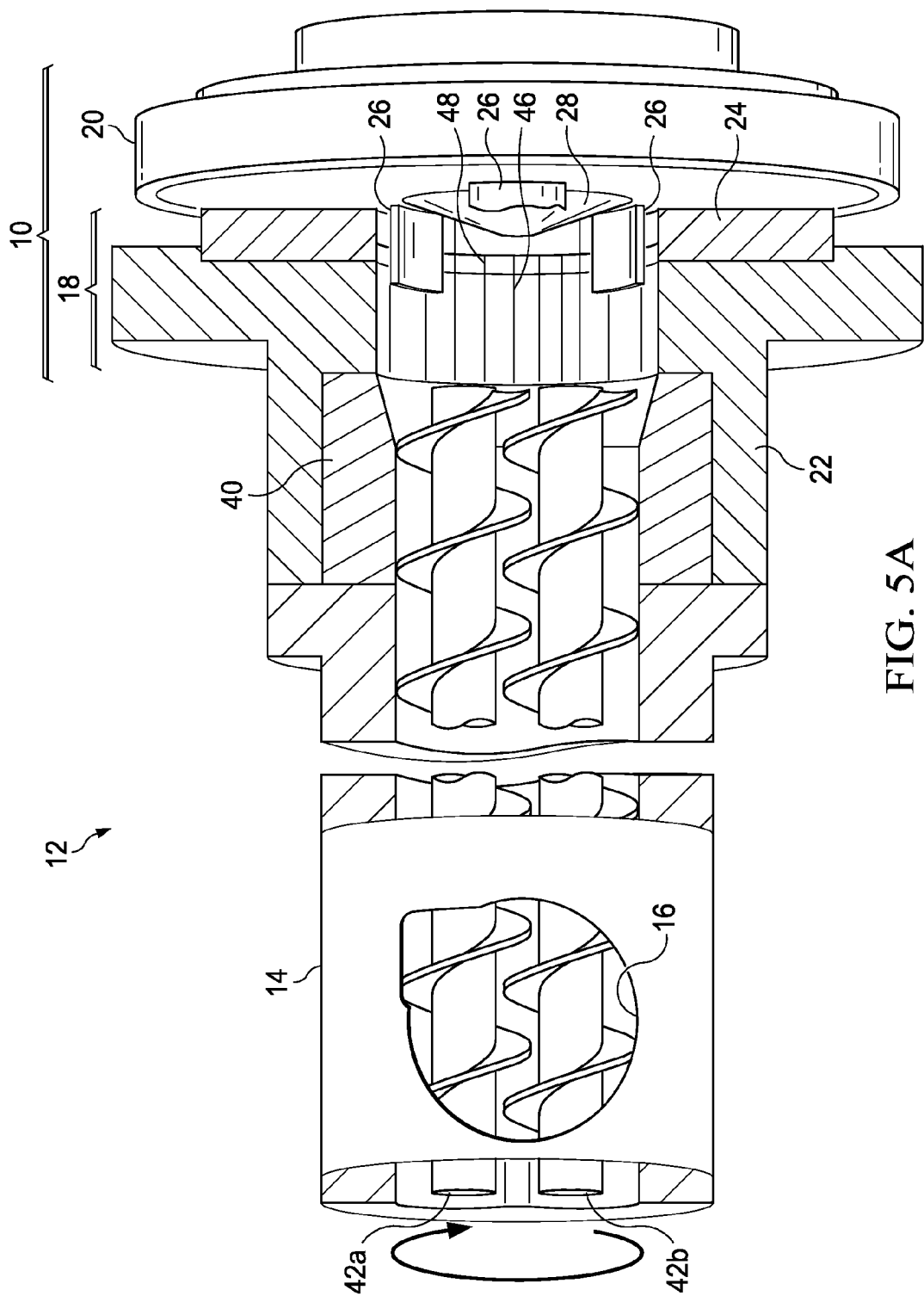
FIG. 5A depicts a top view of one embodiment of an assembled improved extruder.
Figure 5B:
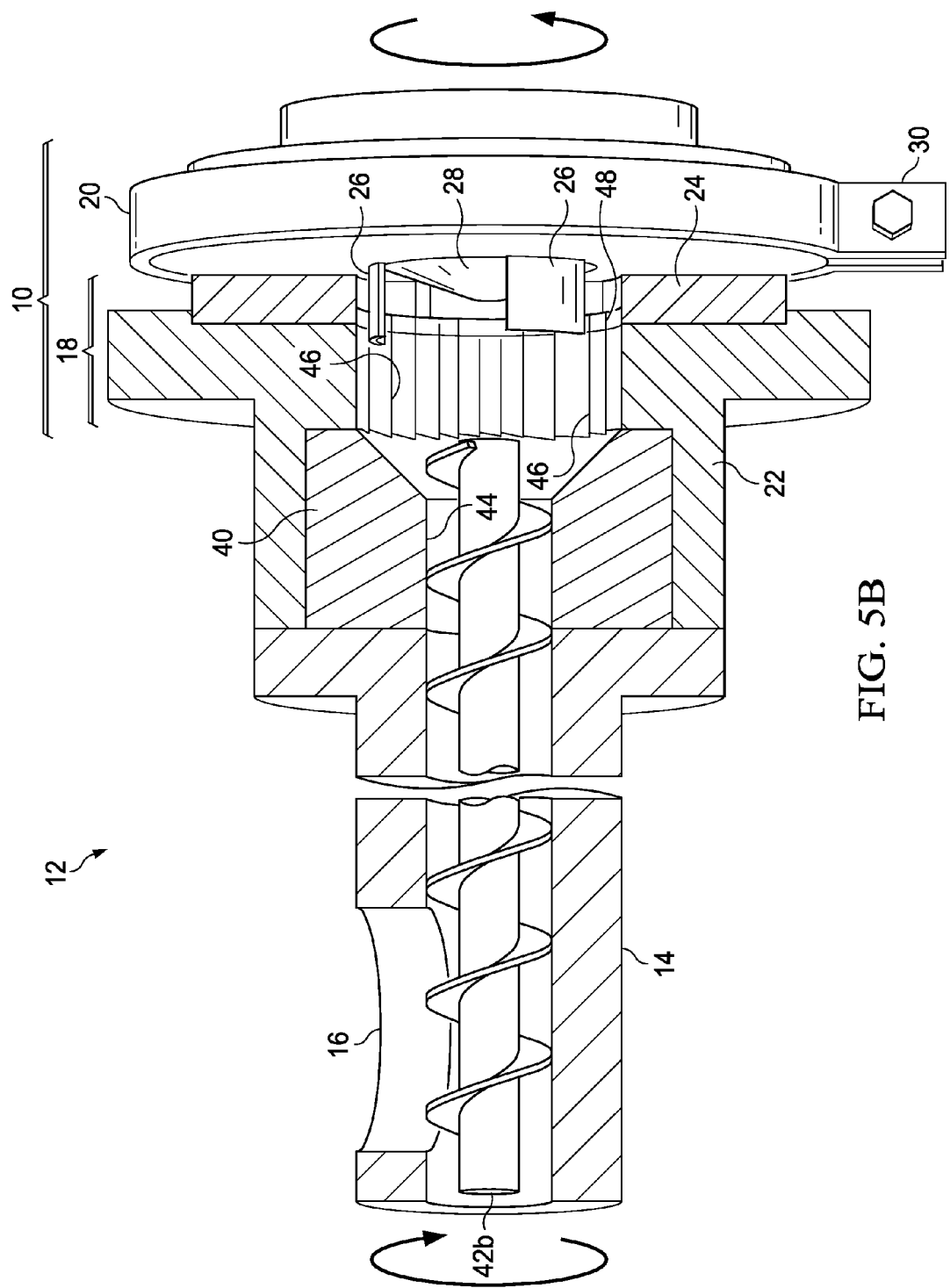
FIG. 5B depicts a cross-sectional side view of the twin auger system within an improved rotary head extruder.

FIG. 4 illustrates an exploded view of the components of an improved rotary head extruder according to one aspect of the present disclosure. The rotary head extruder comprises a hopper 16, much like that of the above described rotary head extruder of FIG. 3, through which raw material is passed into a barrel 14. Materials may be introduced, for example, through a hopper or other funnel device. Within the barrel 14 is a twin screw system comprising two augers 42a,b, also depicted in FIGS. 5A and 5B. A transition piece 40 surrounds an end portion of the augers 42a, b as best shown in FIGS. 5A and 5B. In one embodiment, the distance between the external surfaces of the augers to the inner wall of the barrel 14 may range from between about 0.1 mm to about 0.150 mm. Flight elevates from the base of the auger will stop about 0.1 mm short of the wall in one embodiment. The transition piece 40 fits snugly within the stator head section 22. The internal shape of the transition piece 40 presents a conical shape of flow path 44, best shown in FIG. 6. A figure eight shape is shown on the upstream end of the interior conical flow path 44. The interior conical flow path 44 surrounds an end of each of the auger 42a, b, the conical interior shape comprising a figure-eight shape at its base or upstream end, which diverges to a wide circular downstream end.

Referring to FIG. 5A, in one embodiment, the improved rotary head extruder comprises a twin auger system comprising or consisting of two rotatable augers 42a, 42b within a single barrel 14; a transition piece 40 at a downstream end of the rotatable augers 42a, 42b, the transition piece having a figure eight opening comprising a funnel shape; and a die assembly 10 comprising or consisting of a stator 18 and a rotor 20 with a die gap there between, wherein the stator comprises a stationary plate 24 surrounding an output end of the transition piece and the rotor 20 is a rotatable plate downstream from the stator, the rotatable plate comprising a plurality of fingers 26 surrounding a protruding nose cone 28 of the rotatable plate located within the die gap. The single barrel 14 is positioned at the end of a shaft controlled by a gear box (not shown) and moveably positioned such that the fingers 26 surround downstream ends of the two augers 42a, b when the extruder is operated to undergo random extrusion of food materials. It should be noted that one of the fingers 26 in FIG. 5A is shown only in part so as to better depict the nose cone 28. In practice, each of the fingers 26 comprise the approximate same length and circumferentially surround the nose cone as well as at least a portion of the downstream ends of the two augers 42a, b. Each of the two augers is located equidistant to and on opposing sides of the nose cone in one embodiment. FIGS. 5A and 5B depict the stator 18 and rotor 20 with the small die gap there between, which is present during operation of the rotary head extruder. In one embodiment, the die gap is between about 1.25 mm and about 2.54 mm. As described above with the prior art rotary head extruder, cooked and expanded or puffed product will exit the extruder circumferentially outwards from the die gap.

Figure 6:
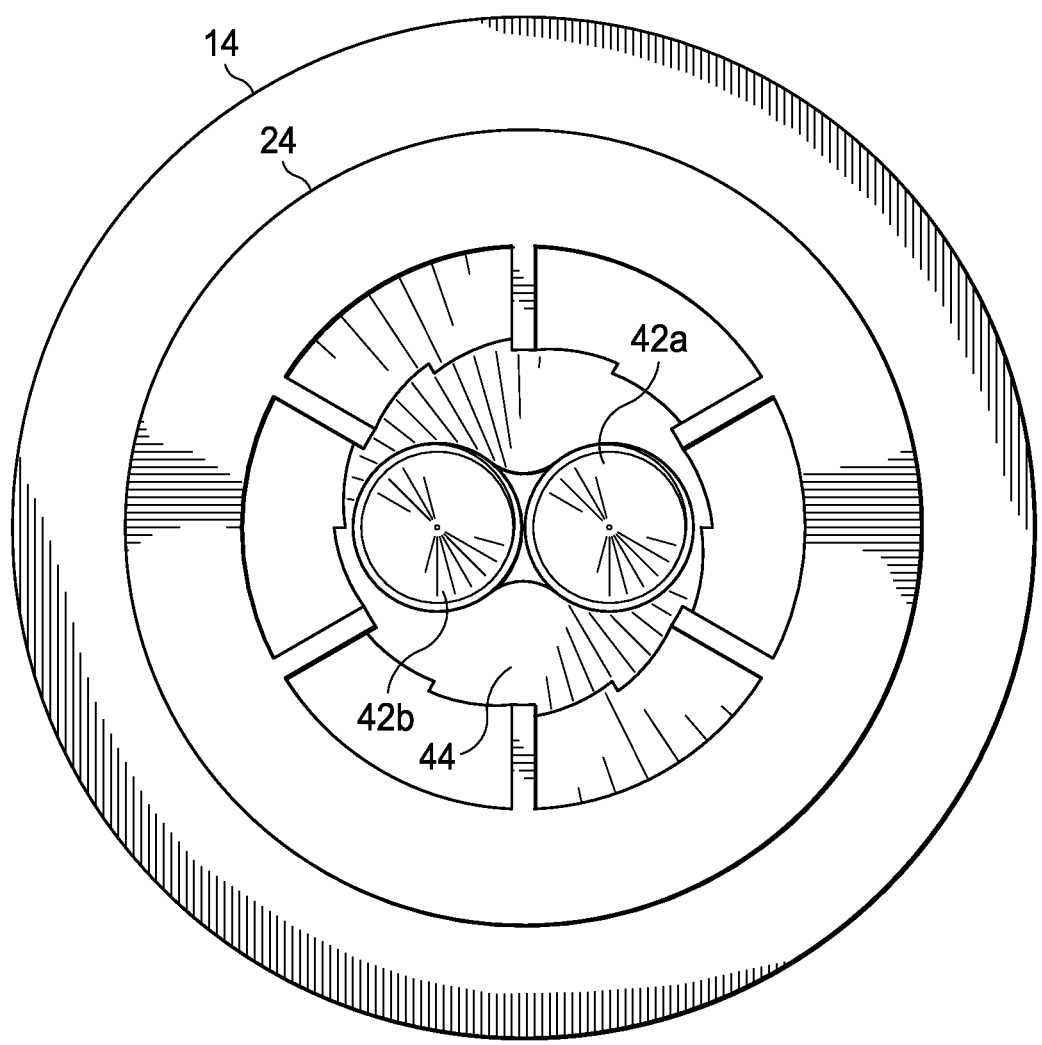
FIG. 6 depicts a forward view of the twin augers in one embodiment of an improved extruder described herein.
Figure 7:
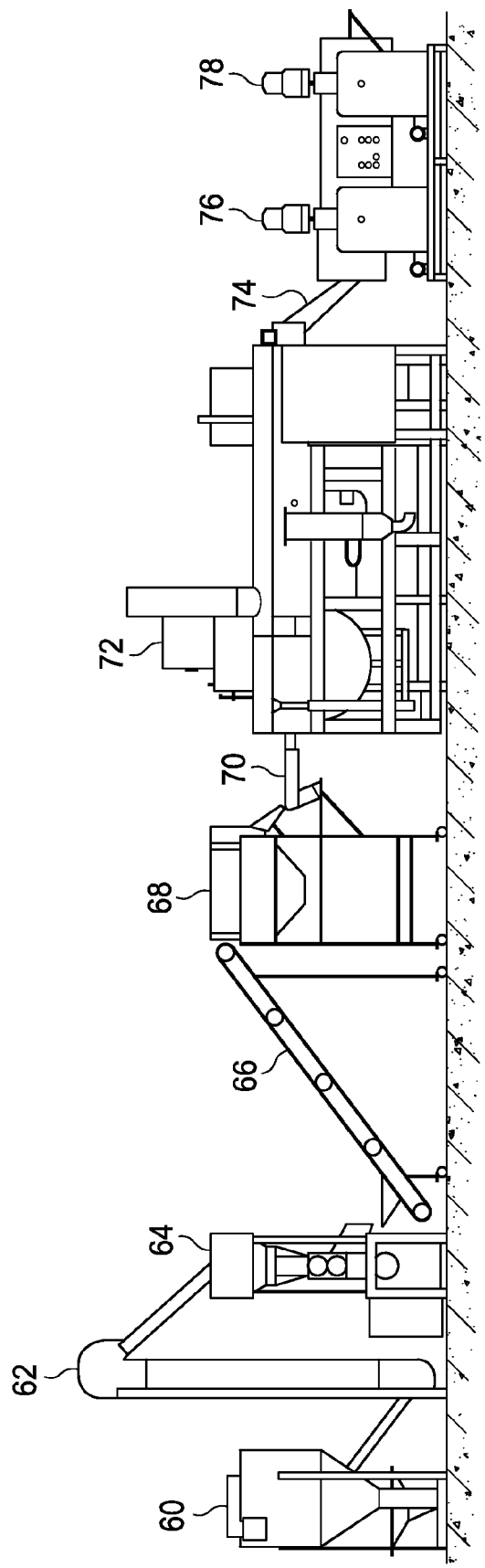
FIG. 7 depicts a random extrusion line process incorporating the extruder described herein.

FIG. 6 depicts an interior conical flow path 44 between the external surfaces of the augers 42a, 42b and the walls of the barrel 14. The interior conical flow path 44 encloses an end of the two augers 42a, 42b tightly, forming a figure eight opening at the most upstream end of the transition piece 40 towards the barrel 14. The opening remains constant for a length along a downstream end of the augers and then funnels out, widening at the exit end of the material to be plasticized in the two bronze plates. The single barrel 14 houses the two augers 42a,b and extends horizontally along at least half their connecting with the transition piece 40 and into the figure 8-shape of the conical flow path 44. While depicted as a separate piece in the figures, the transition piece 40 may also be an integral part of the stator head section 22 adjacent to the downstream end of the augers.

Returning to FIGS. 5A and 5B, the stator 18 comprises a stator head section 22 with interior grooves 46 at its outlet end. The interior grooves are preferentially horizontal and circumferentially spaced around the circular opening. In addition, the interior grooves 46 should substantially align at their downstream ends with the grooves 48 of the stationary plate 24, which surrounds the outlet end of the stator head 22. In one embodiment, the stationary plate 24 is comprised or consists of bronze. Other metals may also be possible so long as friction remains generated in operation. On the upstream end, the interior grooves 46 meet with the downstream end of the transition 40 and interior conical flow path 44, the conical shape having a slope extending outwards to meet with the interior grooves 46. Thus, the interior conical flow path 44 comprises a funnel-like shape with its wide end facing the grooves 46 of the stator 18. In one embodiment, the slope of the interior conical portion of the transition piece 40 begins at a location behind the two augers, or at their downstream tip ends, to meet the interior grooves 46 of the stator head section 22. In one embodiment, the slope is less than about 75 degrees. In one embodiment, the slope is less than about 65 degrees. In one embodiment, the slope is less than about 60 degrees. The slope should generally allow for a smooth transition and continuous flow of extrudate to the die assembly. In one embodiment, the stator head section 22 surrounds the interior conical portion 44, which provides for a quick transition or short slope end portion between the two auger ends and the stator 18. As perhaps best shown in FIG. 5B, the transition piece 40 comprises an upstream portion having a substantially constant or equal thickness along its length. This equivalent upstream stem portion spans at least half the length of the transition piece 40. The downstream end of the transition piece 40 comprises a funnel like shape, which slopes out to a conical mouth with a wider opening at its most downstream end. The interior conical portion provides for smooth flow of materials to the die assembly 10, where they will ultimately be cooked and puffed. The rotor 20 has its own motor drive (not depicted) to control the speed and rotation of the rotor during extrusion.

By successfully incorporating a twin-screw system into an extruder that is still capable of producing random extrusion processes, the transfer of granular materials inside the extruder to the rotary die is improved. The twin screw rotary head extruder described herein improves the stability of the overall process and creates a robust random extrusion system capable of accepting a wide variety of raw materials for production of diverse random collets. During random extrusion, the two augers 42a, b may rotate independently (actuated by separate power sources or a transmission gear) but in the same direction to provide for intermeshing effects to convey materials between the walls of the single barrel and the augers. In one embodiment, the two augers are connected via a gearbox. As depicted in FIGS. 5A and 5B, in one embodiment, the augers are positioned horizontally within the single barrel adjacent to one another. However, in one embodiment, the augers 42a,b may also be position vertically, or one on top of the other. In one embodiment, the two augers will rotate at speeds of between about 150 to about 500 rpm. In another embodiment, the two augers will rotate at speeds of between about 200 to about 350 rpm. In another one embodiment, the two augers will rotate at speeds of between about 300 to about 320 rpm.

The twin-auger system is self-wiping and closely intermeshing, transferring materials by a positive displacement action by its co-rotating mechanism, which makes the process more independent of the nature and composition of the raw material. Transfer limitations due to constituents of the raw material difficult to convey such as fiber, oily particles, small particulates, or other lubricant-acting components are overcome and conveyance is improved. There remains no added water, heating element or cooling element used within the rotary head extruder described herein. The energy used to cook the extrudate is generated from the friction of the die assembly. There are no holes or openings in either the stator or rotor, and the random collets exit the rotary head extruder circumferentially outward from the gap between the stator and rotor.

The twin screw rotary head extruder described herein can successfully handle continuous random extrusion of varied materials as well as materials of variable sizes. For example, corn meal having a wide range of particle sizes has been successfully tested, including those that have previously imparted challenges due to the very different particles sizes of the corn meal. In one embodiment, a particle size distribution of between 200 and 900 micrometers can be fed into the rotary head extruder of the present disclosure and successfully random extruded. In this embodiment, up to or about 80% by weight of the particle size distribution may comprise fine particle size of about 400 micrometers. In other embodiments, the particles may range from about 200 to about 1200 micrometers, with optionally about 50% of the particle size distribution reaching up to or about 400 micrometers. Additional embodiments and examples are provided below.

In accordance with another aspect of the present disclosure is a method of random extrusion comprising the steps of feeding raw materials into a single barrel comprising or consisting of two augers positioned within a tightly fitting encasing within the single barrel; and conveying the raw materials towards a die assembly through an intermeshing mechanism of the augers, said die assembly comprising a stator and a rotor with a die gap there between, wherein the stator is a stationary plate surrounding an output end of the single barrel and the rotor is a rotatable plate downstream from the stator, the rotatable plate comprising a plurality of fingers surrounding a protruding nose cone of the rotor located within the die gap. In one embodiment, the raw materials pass through an interior conical portion prior to reach the rotary die assembly.

As depicted in FIGS. 5A and 5B, the nose cone of the rotor protrudes inwardly with its tip facing the stator such that the nose cone is positioned within the die gap. The single barrel housing the auger system may be positioned so as to create the die gap between the stator and rotor. In some embodiments, the die gap may be between about 1.35 to about 1.8 mm. The positioning step places the single barrel with its two augers such that the fingers of the rotatable plate surround at least a portion of the downstream ends of the two augers. The fingers may also surround the downstream ends of the two augers in one embodiment or may be in close proximity to the downstream ends from between about 2 to about 6 mm in distance in one embodiment. The feeding step comprises a feed rate for raw materials of between about 200 to about 550 lbs/hr. In one embodiment, the feeding step comprises a feed rate of between about 400 to about 550 lbs/hr. In one embodiment, the feeding step comprises a feed rate of over 450 lbs/hr.

As described above, a wide range of raw materials is possible using the improved rotary head extruder device described herein. The raw materials may comprise one or more of corn meal, whole grain corn meal, rice, whole grain flour, rice pea, brown rice, wheat flour, whole wheat flour, pea flour, black bean, pinto bean flour, potato flour, and other grain legumes or tubers whether in flour, powder or other granular form.

Raw materials comprising a moisture between about 1.0% to about 18% may generally be used to form random extruded products in the rotary head extruder described herein. In one embodiment, the method may comprise the step of pre-moistening or pre-hydrating the raw materials for introduction into the rotary head extruder. In one embodiment, the raw materials comprise an initial moisture content of between about 11% to about 12.5%. Raw materials may be pre-hydrated to from about 14.5% to about 18% moisture by weight. In one embodiment, the raw materials are pre-hydrated to about 16.9% in-barrel moisture content by weight. In one embodiment, the method may comprise the step of pre-mixing raw materials, which may include mixing one type of raw material with water or with other raw materials with water for moistening prior to introduction into the improved rotary head extruder. In this way, different materials can be moistened to the same approximate moisture level, for example.

During extrusion, and perhaps more specifically, the conveying step, both augers co-rotate and intermesh, whether independent of one another or not, in the same direction and/or speed. In one embodiment, a twin shot gear box may be used to rotate both augers simultaneously, or a single gear box with one motor moves two shafts. In one embodiment, each auger may comprise its own gear box to co-rotate independent of one another at the same speed. In one embodiment, the conveying step may comprise an auger speed of about 100 to 400 rpm. Typically, the die gap remains constant during extrusion once the single barrel (and its the two augers) and rotor is positioned to set the gap, with only small adjustments if necessary in the range of +/−0.5 mm. The temperature of the stator head may range from between about 260 to about 320 F. In some embodiments, the rotor speed may be adjusted to from about 250 to about 600 RPM.

The method further comprises the step of expanding the raw materials into a food product comprising a bulk density of between about 3.0 and 11 lbs./cu ft, most preferably between 3.0 and 6.5 lb/cu ft. In one embodiment, expanded and puffed food product comprises a bulk density of between about 4.5 and about 5.0 lbs./cu ft. A cutting step may also be used to cut the expanded and puffed food product to a desirable size.

By way of example, FIG. 6 depicts a random extrusion processing line into which the rotary head extruder described herein may be introduced. Briefly, as shown in FIG. 6, in a first step of a random extrusion line, a mixer 60 adds moisture as it mixes the raw materials. The mixer may be vertical, as depicted in FIG. 6, or horizontal (not pictured). The raw materials are then transferred to a bucket elevator 42, which elevates the materials to the hopper 64 of the rotary head extruder. Next, extrusion forms hard dense extruded product utilizing rotating brass plates, as previously discussed above. The product is then conveyed 66 to a fines tumbler 68, which removes small fines from the product. The product then passes through a vibratory feeder 70 to provide even feed to a fryer 72, such as a rotary fryer, which decreases moisture and adds oil to the extruded product. Next, an additional vibratory feeder 74 transfers product to a coating tumbler 76, wherein oil, flavor and salt are mixed. The products can then be turned in a flavor drum 57, wherein flavor is applied to the surface of the random collets.

It should be noted that while FIG. 6 describes a process for producing fried random corn collets, such illustration is not meant to limit the scope of this embodiment. In one embodiment, the rotary head extruder described herein may be incorporated into a fried corn collet production line for producing fried corn collets. In one embodiment, the rotary head extruder described herein may be incorporated into a baked corn collet production line for producing baked corn collets.

The invention will now be further elucidated with reference to the following examples, which should be understood to be non-limitative. It should be appreciated by those of ordinary skill in the art that the techniques disclosed in the examples that follow represent ones discovered by the inventors to function well in the practice of the invention and thus, constitute exemplary modes. One of ordinary skill in the art, when armed with this disclosure, should appreciate that many changes can be made in the specific embodiments while still obtaining similar or like results without departing from the spirit and scope of the present invention.

Example 1

Whole Grain Blend

A mixture of whole grain cornmeal and yellow corn meal are blended to created a whole grain blend for extrusion and formation of whole grain random collets. The mixture comprises 55% whole grain cornmeal and 45% standard cornmeal. The mixture is introduced into a mixer and 4-7% water is added. The mixture was mixed to moisten the whole grain blend until it achieved a moisture content of about 15-18%. The particle size distribution of this particular cornmeal is between 100 and 700 microns with up to 58% comprising particle size of about 425 microns. An in-barrel moisture content of about 15.9% was determined. The rotor position or gap was set to about 1.52 mm, and the stator head temperature was recorded to be about 146 C. The auger speed was initially set to about 228 rpm and the rotor comprised a rotor speed of about 500 rpm. Product rate was measured to be about 467 lb/minute, with resulting expanded, puffed product resulting with a bulk density of about 4.75 lbs/cu ft.

Example 2

Rice Flour Blend 1

A mixture of rice flour, yellow corn meal and yellow pea flour was blended to create a rice flour blend for extrusion and formation of rice flour random collets. The mixture comprised about 60% rice flour, 30% corn meal, and 10% yellow pea flour. All percentages are by weight unless otherwise disclosed. The mixture is introduced into a mixer and 7% water is added. The mixture was mixed to moisten the whole grain blend until it achieved a moisture content of about 17.5%. The rotor position or gap was set to about 1.60 mm, and the stator head temperature was recorded to be about 132° C. The auger speed was initially set to about 275 rpm and the rotor comprised a rotor speed of about 530 rpm. Product rate was measured to be about 400 lb/minute, with resulting expanded, puffed product resulting with a bulk density of about 5.5 lbs/cu ft.

Example 3

Rice Flour Blend 2

A mixture of rice flour, yellow corn meal and yellow pea flour was blended to create a rice flour blend for extrusion and formation of rice flour random collets. The mixture comprised about 55% rice flour, 30% whole-grain corn meal, and 15% yellow pea flour. All percentages are by weight unless otherwise disclosed. The mixture is introduced into a mixer and 7% water is added. The mixture was mixed to moisten the whole grain blend until it achieved a moisture content of about 17%. The rotor position or gap was set to about 1.60 mm, and the stator head temperature was recorded to be about 139° C. The auger speed was initially set to about 275 rpm and the rotor comprised a rotor speed of about 530 rpm. Product rate was measured to be about 340 lb/minute, with resulting expanded, puffed product resulting with a bulk density of about 5.2 lbs/cu ft.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Unless otherwise defined, all technical and scientific terms and abbreviations used herein have the same meaning as commonly understood by one of ordinary skill in the art to which the invention pertains.

The method illustratively disclosed herein suitably may be practiced in the absence of any element that is not specifically disclosed herein. In some embodiments, the methods described herein may suitably comprise or consist only of the steps disclosed. Similarly, the formulations may comprise or consist only of the components disclosed. Individual numerical values and/or ranges are stated as approximations as though the values were preceded by the word "about" or "approximately." As used herein, the terms "about" and "approximately" when referring to a numerical value shall have their plain and ordinary meanings to a person of ordinary skill in the art to which the disclosed subject matter is most closely related. It should be understood that the exact value following the term "about" or "approximately" is also a suitable range or value without the approximate terms.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, all modifications and equivalents of the subject matter recited in the claims appended hereto are included within the scope of the claims as permitted by applicable law. Moreover, any combination of the above-described elements in all possible variations thereof is encompassed unless otherwise indicated herein or otherwise clearly contradicted by context.

What is claimed is:

1. A rotary head extruder comprising:
    a twin auger system comprising two rotatable augers within a single barrel and a transition piece at a downstream end of the rotatable augers;
    a die assembly comprising a stator and a rotatable plate with a die gap there between, the stator comprising a stator head at a downstream end of the augers and a stationary plate surrounding an outlet end of the stator head downstream from the single barrel, and the rotatable plate downstream from the stationary plate, the transition piece within the stator head,
wherein the transition piece begins at a location behind a downstream end of the two augers and diverges to a wider opening in communication with the stationary plate.

2. The rotary head extruder of claim 1 wherein the transition piece comprises an interior flow path and a circular downstream end.

3. The rotary head extruder of claim 1 wherein the die gap is between about 1.35 and about 2.54 mm during operation of the extruder.

4. The rotary head extruder of claim 1 wherein the stator head section comprises interior grooves in communication with the transition piece.

5. The rotary head extruder of claim 1 wherein the twin augers rotate simultaneously.

6. The rotary head extruder of claim 1 wherein the twin augers rotate at speeds of between about 100 to about 400 rpm.

7. The rotary head extruder of claim 1 wherein the two augers are positioned horizontally within the single barrel.

* * * * *